United States Patent [19]

Takase

[11] Patent Number: 5,534,960
[45] Date of Patent: Jul. 9, 1996

[54] CAMERA CAPABLE OF WINDING AND REWINDING FILM BY REVOLUTION OF MOTOR

[75] Inventor: Masami Takase, Tokyo, Japan

[73] Assignee: Olympus Optical Co., Ltd., Tokyo, Japan

[21] Appl. No.: 225,898

[22] Filed: Apr. 11, 1994

[30] Foreign Application Priority Data

Apr. 13, 1993 [JP] Japan ................................. 5-086389

[51] Int. Cl.⁶ .................................................. G03B 1/18
[52] U.S. Cl. ........................................................ 354/173.1
[58] Field of Search ............................... 354/173.1, 266, 354/75, 76, 173.4

[56] References Cited

U.S. PATENT DOCUMENTS 5,014,079  5/1991  Hoshino et al. ....................... 354/266
5,162,832  11/1992  Kakita et al. .......................... 354/266

Primary Examiner—David M. Gray
Attorney, Agent, or Firm—Frishauf, Holtz, Goodman, Langer & Chick

[57]  ABSTRACT

The present invention provides a camera having a film feed mechanism comprising a microphone for sensing the surrounding noise around the camera, a noise level measuring portion for measuring the sensed noise (sound pressure), a noise level discriminator for comparing the measured noise level with a predetermined level to discriminate whether the measured noise level is higher or lower than the predetermined level, a feed mode change-over portion for changing the film feed speed to a silent mode or a normal film feed by selecting the normal film feed or the film feed whose generated noise level is low in response to the discriminated noise level, and a film feed mechanism for feeding a film in both winding and rewinding.

16 Claims, 4 Drawing Sheets

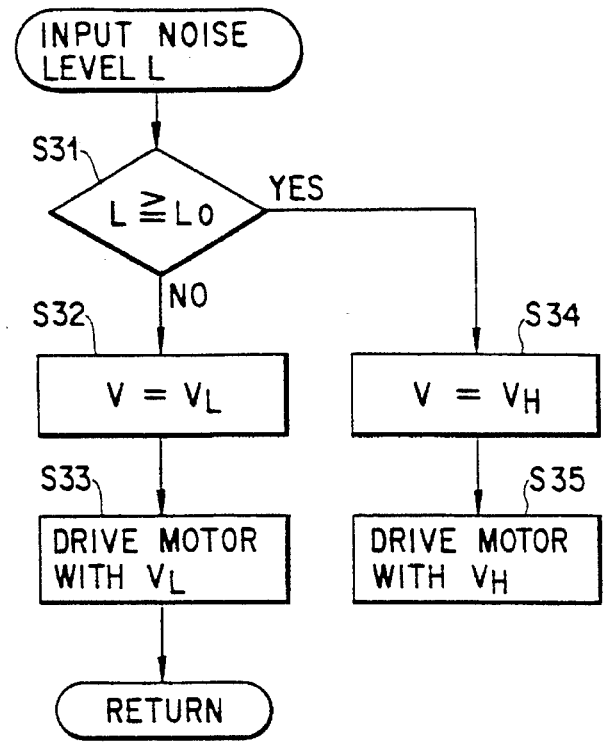
F I G. 4
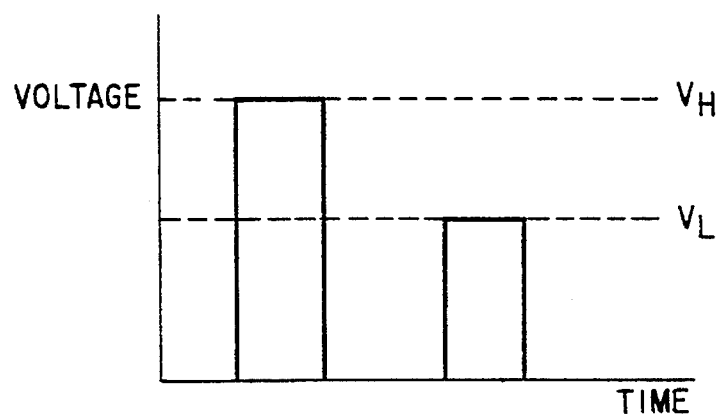
F I G. 5

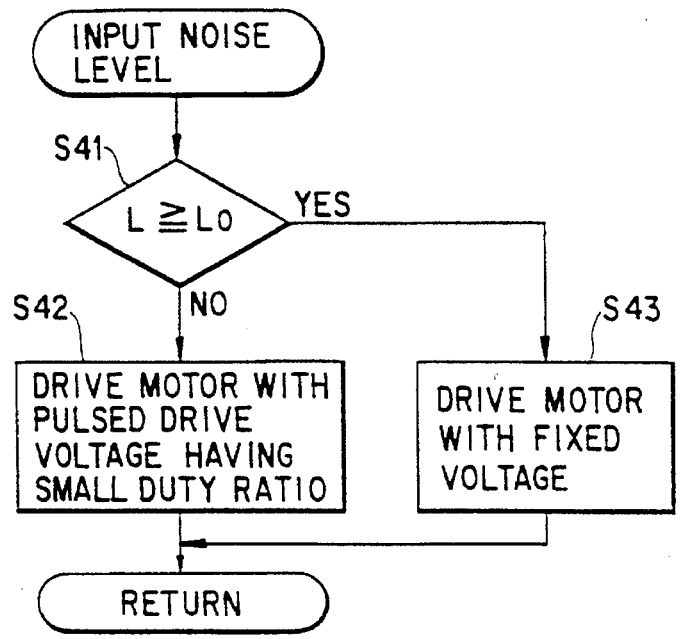
F I G. 6
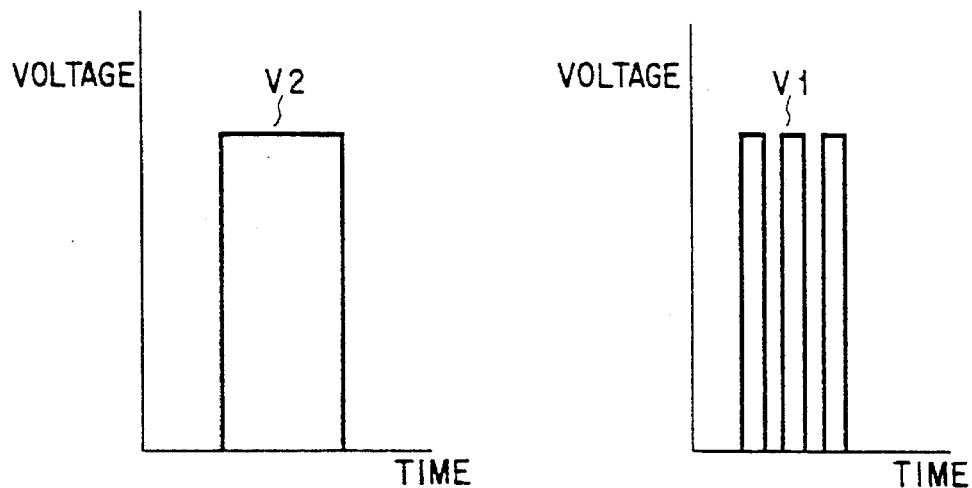
F I G. 7A   F I G. 7B 5,534,960

CAMERA CAPABLE OF WINDING AND REWINDING FILM BY REVOLUTION OF MOTOR

BACKGROUND OF THE INVENTION

1. Field of the Invention

The present invention relates to a camera being capable of winding and rewinding a film by a revolution of a motor, and having a silent film feed mode for reducing film feed noise in response to the surrounding noise level.

2. Description of the Related Art

Conventionally, in a camera having an automatic film feed mechanism by a motor, it has been well known that winding and rewinding of a loaded film (film feeding) should be done as fast as possible in order to prepare the following shot or to load the following roll of film when winding the film before taking a photo or rewinding the film after taking a photo.

Due to this, a small and powerful DC motor has been mounted in the camera to improve a film feeding speed.

However, in accordance with the higher film feeding speed, the noise level generated in feeding the film becomes much higher than the conventional case, and there occur troubles at a place where silence is required or time when silence is required. There is a case that such noise is produced by the fact that noise, which is generated when the feed mechanism is operated at a high speed, is added to noise, which is generated from the motor.

In order to solve such troubles, for example, Japanese Patent Application KOKAI Publication No. 2-191925 discloses a camera having a change-over mode for changing the rewinding speed to change the mode in response to the state of the surroundings, thereby making it possible to select either a silent mode in which generating noise is reduced by decreasing a rewinding speed thereby rewinding the film or a high speed mode in which the film is rewound with a high noise level.

However, in the above publication, since a photographer manually operates a changing switch, there will occur a case in which noise is erroneously given off if the photographer forgets to change the mode. Also, generally, when the rewind of the film is started, such an operation cannot be temporarily stopped and the mode cannot be changed so as to change the film winding speed until the rewind of the film is finished. Due to this, in the case of the erroneous operation, there is a case in which the film is rewound in the silent mode even when the photographer may rewind the film in the normal mode.

Moreover, if a photographer cannot judge the mode selection with regard to the surrounding noise level, and winds or rewinds the film beyond necessity in the silent mode in which the feeding speed is low, rewinding time is made longer or a chance for releasing the shutter may be lost.

SUMMARY OF THE INVENTION

Therefore, an object of the present invention is to provide a camera which can feed a film in a silent mode in response to a noise level of the surroundings at the time of feeding the film.

According to the present invention, first, there is provided a camera being capable of winding and rewinding a film by a revolution of a motor, comprising noise level measuring means for measuring a noise level of the surroundings of the camera; noise level discriminating means for discriminating whether the noise level measured by the noise level measuring means is higher or lower than a predetermined value; and control means for controlling a revolution speed of a motor for feeding a film based on the result of the level discriminated by the noise level discriminating means.

Secondly, according to the present invention, there is provided a camera being capable of winding and rewinding a film by a revolution of a motor, comprising noise level measuring means for measuring a noise level of the surroundings of the camera; noise level discriminating means for discriminating whether the noise level measured by the noise level measuring means is higher or lower than a predetermined value; film feeding means for rewinding a film after exposure and/or a film after rewinding a film after taking a predetermined number of photos; and changing means for changing a film feeding mode to a normal mode for feeding the film at a predetermined normal speed or a silent mode for feeding the film at a higher speed than the normal speed based on the result of the level discriminated by the noise level discriminating means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a first embodiment of the present invention regarding a noise level input of the flow chart of FIG. 3;

FIG. 5 is a view showing high and low drive voltages to be applied to a motor;

FIG. 6 is a second embodiment of the present invention regarding a noise level input of the flow chart of FIG. 3; and FIGS. 7A and 7B are views showing the drive voltage of a fixed voltage wave form to be applied to the motor and that of a pulse wave form applied thereto.

DETAILED DESCRIPTION OF THE PREFERRED EMBODIMENTS

The embodiments of the present invention will be explained in detail with reference to the drawings.

The outline of the camera of the present invention can be explained as follows.

The surrounding noise level is measured in accordance with the input of a film feed start signal. The measured level is compared with a predetermined level. It is selected whether a normal film feed is performed or a film feed with a low level of a feed noise (silent mode) is performed based on the compared result. Thereby, either the film winding or the film rewinding is performed. In this embodiment, in the case that the silent mode is selected, the film feed speed (the revolution of the motor) is lower than the film fed speed in the normal mode.

Figure 1:
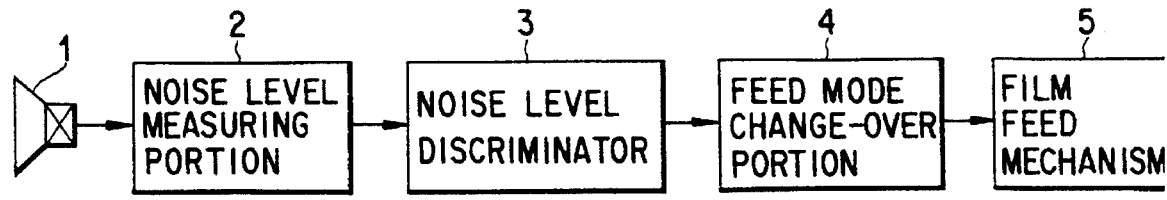
FIG. 1 is a block diagram showing the outline of a film feed mechanism, which is a feature of a camera of the present invention.

FIG. 1 is a block diagram showing the outline of a film feed mechanism, which is a feature of a camera of the present invention.

The film feed mechanism comprises a microphone 1 for sensing the surrounding noise around the camera, a noise level measuring portion 2 for measuring the sensed noise (sound pressure), a noise level discriminator 3 for comparing the measured boise level with a predetermined level to discriminate whether the measured noise level is higher or lower than the predetermined level, a feed mode changeover portion 4 for changing the film feed speed to a silent mode or a normal film feed by selecting the normal film feed or the film feed whose generated noise level is low in response to the discriminated noise level, and a film feed mechanism 5 for feeding a film in both winding and rewinding.

Figure 2:
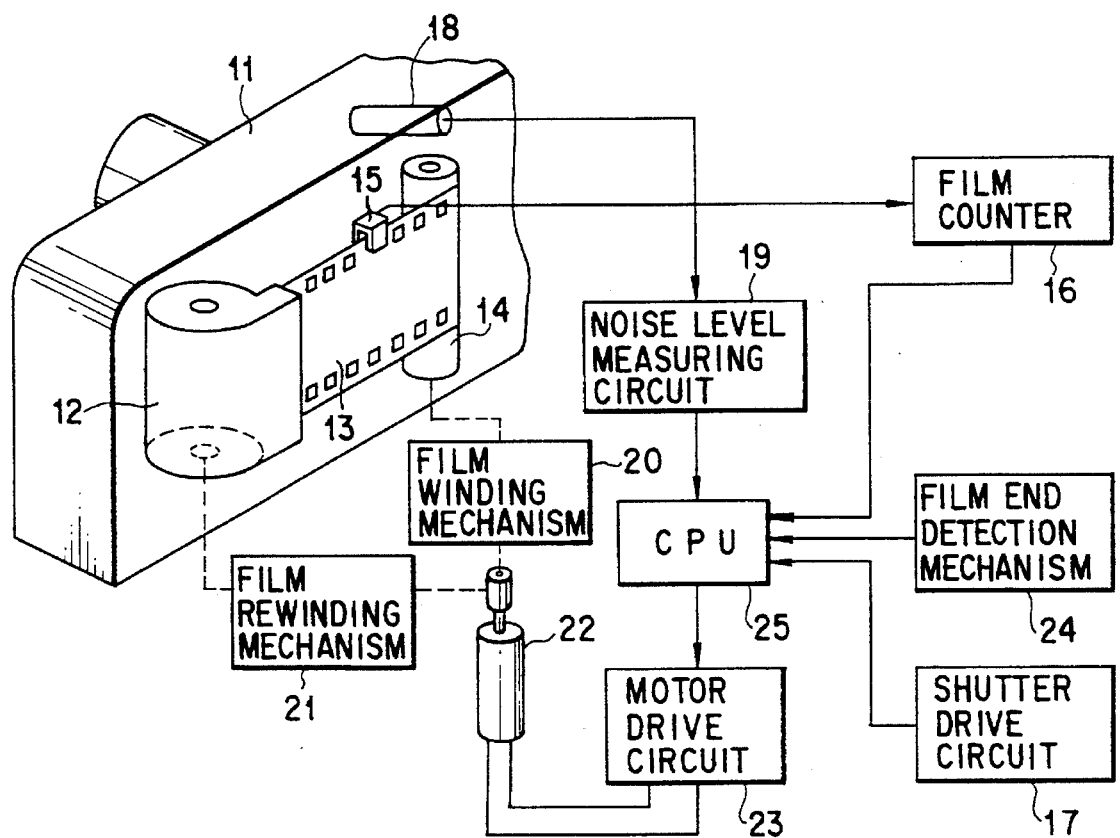
FIG. 2 is an illustration showing the structure in which the film feed mechanism of FIG. 1 is mounted on the camera.

FIG. 2 shows the structure in which the film feed mechanism is mounted on the camera.

In a camera shown in FIG. 2, a film 13 is delivered from a film cassette 12 loaded on the camera 11, and is wound around a take-up spool 14 of the camera. A photo-interrupter 15 is provided to detect the movement of perfolations on the film 13. A film counter 16 is provided to identify the position of the film as much as one frame by counting one frame of the film by a signal generated from the photo-interrupter 15.

Also, there are provided a shutter drive circuit 17 for detecting a finish timing of a shutter (not shown), a microphone 18 stored in the camera 11, a noise level measuring circuit 19 for measuring the surrounding noise level captured by the microphone 18, a film winding mechanism 20, connected to the spool 14, for winding the film 13 by reduction gears (not shown), a film rewinding mechanism 21, connected to the film cassette 12, for rewinding the film 13 by reduction gears (not shown), a motor 22 for driving the winding mechanism 20 and the rewinding mechanism 21, a motor drive circuit 23 for driving the motor 22, a film end detection mechanism 24 for detecting the end of the film 13, and a central processing unit (CPU) 25 for controlling each of the above components.

An operating procedure of winding and rewinding the film of the above-structured camera will be explained with reference to a flow chart shown in FIG. 3.

When the load of the film 13 on the camera is finished, the camera is set in a state that a photo can be taken, and a film counter K is set to "1" (step S1). A photo taking sequence begins by pressing a release button (not shown) (step S2). When the shutter drive is ended, a shutter drive end signal is inputted to the CPU 25 from the shutter drive circuit 17 (step S3).

A film end detection is carried out by the film end detection mechanism 24. If it is detected that the film is not ended (NO), the surrounding noise level is measured to prepare a next photo taking (step S6). Then, the measured surrounding noise level is compared with a predetermined reference noise level (step S6).

As a result of the comparison, if the measured surrounding noise level is lower than the reference noise level, a low voltage is applied to the motor 22 to be driven (step S7), the film counter K is advanced by one (step S8), and the motor 22 is stopped (step S11).

If the measured surrounding noise level is lower than the reference noise level in the comparison in step S6, a high voltage is applied to the motor 22 to be driven (step S9), the film counter K is advanced by one (step S10), and the motor 22 is stopped (step S11). After the motor 22 is stopped in step S11, the operation returns to the step S2, and the photo taking sequence repeats again.

If the film end is detected (YES) in step S4, the flow advances to a sequence for rewinding the film 13.

The motor 22 is connected to the film rewinding mechanism 21 by changing over a clutch (not shown) to the film winding mechanism 21 from the film winding mechanism 20 (step S12). Then, the surrounding noise is measured by the noise level measuring circuit 19 (step S13), and the measured surrounding noise level is compared with the predetermined reference noise level (step S14).

As a result of the comparison, if the measured surrounding noise level is lower than the reference noise level, a low voltage $V_L$ is applied to the motor 22 to be driven (step S15) as shown in FIG. 5. When the film counter K becomes zero (step S19), the motor 22 is stopped (step S19). Moreover, if the measured surrounding noise level is higher than the reference noise level, a high voltage $V_H$ is applied to the motor 22 to be driven (step S17) as shown in FIG. 5. When the film counter K becomes zero (step S18), the motor 22 is stopped (step S19).

Then, after the motor 22 is stopped and the rewinding operation is finished, the rewind mechanism 21, which is connected to the motor 22, is released therefrom by a clutch (not shown). Then, the winding mechanism 20 is connected to the motor 22, and all of the operation sequence are finished.

Figure 3:
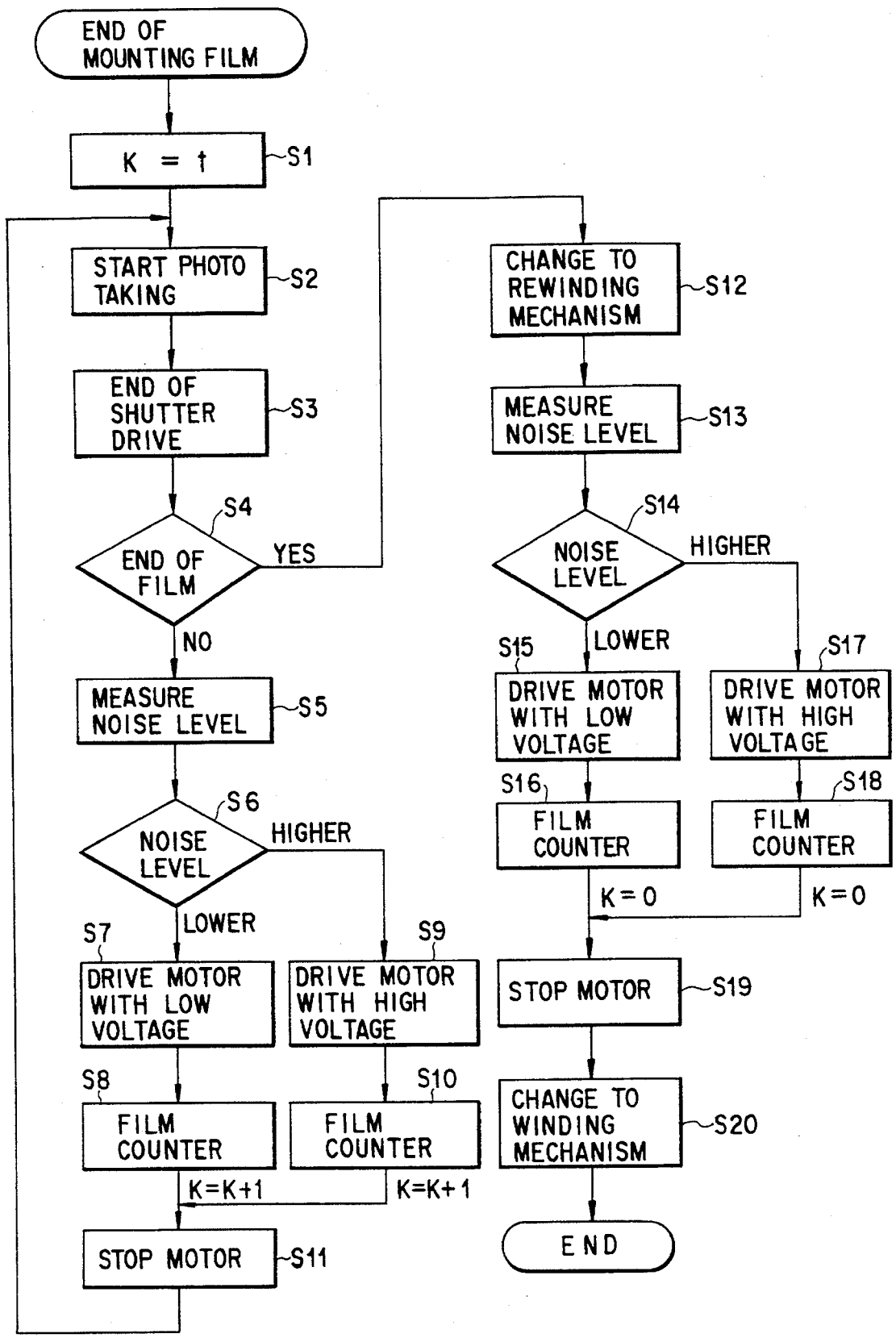
FIG. 3 is a flow chart explaining the operation of winding and rewinding the film of camera of FIG. 2.

FIG. 4 specifically shows the embodiment described in steps S6 to S9 and S14, S15, and S17 of the flow chart shown in FIG. 3.

When the surrounding noise level L is inputted, the surrounding noise level L is compared with the predetermined reference level $L_0$ (step S31). As a result of the comparison, if the surrounding noise level L is lower than the predetermined reference level $L_0$ (NO), the drive voltage V to be applied to the motor 22 is set to the low voltage $V_L$ as shown in FIG. 5, so that the motor 22 is driven with the low voltage $V_L$ (step S33).

If the surrounding noise level L is higher than the predetermined reference level $L_0$ (YES), the drive voltage V to be applied to the motor 22 is set to the high voltage $V_H$ as shown in FIG. 5, so that the motor 22 is driven with the low voltage $V_H$ (step S35).

In this embodiment, the revolution of the motor is regulated by controlling (varying) the drive voltage to be applied to the motor. However, the method of regulating the revolution of the motor is not limited to the above embodiment.

The flow chart in FIG. 6 shows another operating procedure of a pulsed driving method by varying a duty ratio of the drive voltage to be applied to the motor.

When the surrounding noise level L is inputted, the surrounding noise level L is compared with the predetermined reference level $L_0$ (step S41). As a result of the comparison, if the surrounding noise level L is lower than the predetermined reference level $L_0$ (NO), the motor 22 is driven with a pulsed drive voltage $V_1$ having a small duty ratio as shown in FIG. 7B.

If the surrounding noise level L is higher than the predetermined reference level $L_0$ (YES) in the comparison in step S41, the motor 22 is driven by applying a fixed voltage $V_2$ thereto (FIG. 7A).

Therefore, the revolution of the motor can be regulated by varying the duty ratio of the motor drive voltage.

As a result, according to the above-explained embodiment, the film feed mode is automatically changed to the silent mode in response to the surrounding noise level of the camera and the revolution of the motor is controlled to be low, so that the noise, which is generated in both winding and rewinding the film, can be reduced.

As mentioned above, according to the present invention, there is provided a camera, which can feed the film in the silent mode in response to the surrounding noise level.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A camera being capable of winding and rewinding a film by a revolution of a motor, comprising:

noise level measuring means for measuring a noise level of the surroundings of the camera;

noise level discriminating means for discriminating whether the noise level measured by said noise level measuring means is higher or lower than a predetermined value; and control means for controlling a revolution speed of a motor for feeding a film based on the result of the level discriminated by said noise level discriminating means.

2. A camera according to claim 1, wherein said control means sets the revolution speed of the motor to be high when said discriminated level is higher than said predetermined value, and to be low when said discriminated level is lower than said predetermined value.

3. A camera being capable of winding and rewinding a film by a revolution of a motor, comprising:

noise level measuring means for measuring a noise level of the surroundings of the camera;

noise level discriminating means for discriminating whether the noise level measured by said noise level measuring means is higher or lower than a predetermined value;

film feeding means for rewinding a film after exposure and/or rewinding a film after taking a predetermined number of photos; and changing means for changing a film feeding mode to a normal mode for feeding the film at a predetermined normal speed or a silent mode for feeding the film at a higher speed than the normal speed based on the result of the level discriminated by said noise level discriminating means.

4. A camera according to claim 3, further comprising drive voltage control means for controlling a drive voltage such that a revolution speed of a motor in said normal mode changed by said changing means is lower than the revolution speed of the motor in said silent mode changed by said changing means.

5. A camera according to claim 4, wherein said drive voltage control means drives said motor with a fixed voltage at the time of said normal mode, and drives said motor with a pulsed drive voltage at the time of said silent mode.

6. A camera according to claim 4, wherein said drive voltage control means drives said motor with a high voltage at the time of said normal mode, and drives said motor with a low voltage at the time of said silent mode.

7. A camera being capable of winding and rewinding a film by a revolution of a motor, comprising:

sound pressure level measuring means, provided in a camera body, for measuring a sound pressure level of the surroundings of the camera; and motor controlling means for controlling a revolution speed of said motor in response to an output of said sound pressure level measuring means.

8. A camera according to claim 7, wherein said motor controlling means determines a driving condition of said motor based on the result of a comparison between the output of said sound pressure level measuring means and a predetermined reference level.

9. A camera according to claim 7, wherein said motor controlling means drives said motor by a voltage control.

10. A camera according to claim 7, wherein said motor controlling means drives said motor by a duty control.

11. A camera being capable of winding and rewinding a film by a revolution of a motor, comprising:

sound pressure level measuring means, provided in a camera body, for measuring a sound pressure level of the surroundings of the camera; and mode changing means for comparing an output of said sound pressure level measuring means with a predetermined reference level so as to set a film feeding mode in either a normal mode or a silent mode.

12. A camera according to claim 11, wherein said mode changing means drives said film feeding motor by a voltage control.

13. A camera according to claim 11, wherein said mode changing drives said film feeding motor by a duty control.

14. A camera being capable of winding and rewinding a film by a revolution of a motor, comprising:

sound pressure level measuring means, provided in a camera body, for measuring a sound pressure level of the surroundings of the camera;

storing means for storing a predetermined sound pressure level;

mode changing means for comparing a output of said sound pressure level measuring means with a predetermined reference level so as to set a film feeding mode in either a normal mode or a silent mode; and driving means for driving said film feeding motor in response to an output of said mode changing means.

15. A camera according to claim 14, wherein said driving means drives said film feeding motor by a voltage control.

16. A camera according to claim 14, wherein said driving means drives said film feeding motor by a duty control.

* * * * *